United States Patent
Jeroense et al.

(10) Patent No.: US 9,799,430 B2
(45) Date of Patent: Oct. 24, 2017

(54) METHOD FOR HEAT TREATMENT OF AN ELECTRIC POWER CABLE

(71) Applicant: ABB HV CABLES (SWITZERLAND) GMBH, Baden, Aargau (CH)

(72) Inventors: Marc Jeroense, Karlskrona (SE); Jörn Antonischki, Fågelmara (SE); Kenneth Johannesson, Lyckeby (SE)

(73) Assignee: ABB HV CABLES (Switzerland) GmbH, Baden (CH)

( * ) Notice: Subject to any disclaimer, the term of this patent is extended or adjusted under 35 U.S.C. 154(b) by 0 days.

(21) Appl. No.: 14/435,821

(22) PCT Filed: Dec. 11, 2012

(86) PCT No.: PCT/EP2012/075065
§ 371 (c)(1),
(2) Date: Apr. 15, 2015

(87) PCT Pub. No.: WO2014/090286
PCT Pub. Date: Jun. 19, 2014

(65) Prior Publication Data
US 2015/0332815 A1 Nov. 19, 2015

(51) Int. Cl.
*H01F 7/06* (2006.01)
*H01B 13/22* (2006.01)
(Continued)

(52) U.S. Cl.
CPC ............ *H01B 13/228* (2013.01); *F27D 5/00* (2013.01); *F27D 7/00* (2013.01); *H01B 13/145* (2013.01)

(58) Field of Classification Search
CPC .... H01B 13/145; H01B 13/228; H01B 13/22; F27D 5/00; F27D 7/00
(Continued)

(56) References Cited

U.S. PATENT DOCUMENTS 4,083,515 A * 4/1978 Dickerson .......... B65H 54/2884
242/484.1
4,130,249 A * 12/1978 Steinhilber ............ B65H 54/34
242/480.7
(Continued)

FOREIGN PATENT DOCUMENTS

EP    0 426 927 A1    5/1991
EP    0 470 824 A1    2/1992
(Continued)

OTHER PUBLICATIONS

Andrews et al. "The Role of Degassing in XLPE Power Cable Manufacture", IEEE Electrical Insulation Magazine, Nov. 1, 2006, vol. 22, No. 6, pp. 5-16.
(Continued)

*Primary Examiner* — Paul D Kim
(74) *Attorney, Agent, or Firm* — Birch, Stewart, Kolasch & Birch, LLP (57) ABSTRACT

A method for heat treatment of an electric power cable, the electric power cable including a polymer-based electrical insulation system with a polymer composition. The method steps include placing the electric power cable having the polymer-based electrical insulation system into a heating chamber and exposing the polymer-based electrical insulation system to a heat treatment procedure when the electric power cable is located in the heating chamber. The step of placing the electric power cable into the heating chamber includes winding the electric power cable about a substantially vertical center axis to form a substantially horizontal first layer of a plurality of substantially horizontal turns of the electric power cable, winding the electric power cable about the center axis to form a plurality of substantially horizontal second layers, each second layer being formed by a plurality of substantially horizontal turns of the electric
(Continued)

power cable and stacking the plurality of horizontal second layers above the first layer. An apparatus is provided for performing the method.

15 Claims, 3 Drawing Sheets (51) Int. Cl.
 F27D 7/00 (2006.01)
 F27D 5/00 (2006.01)
 H01B 13/14 (2006.01)
(58) Field of Classification Search
 USPC .......... 29/605–607, 856, 858, 868; 174/115, 174/129 R, 133 R; 264/250, 254, 259, 264/271.1, 294, 295, 275
 See application file for complete search history.

(56) References Cited

U.S. PATENT DOCUMENTS

| 5,890,674 | A | * | 4/1999 | Major | B65H 75/28 |
| | | | | | 242/125.1 |
| 6,089,892 | A | * | 7/2000 | Snow | H02G 3/00 |
| | | | | | 174/505 |
| 6,111,202 | A | * | 8/2000 | Martin | H01B 7/40 |
| | | | | | 174/110 R |
| 6,540,509 | B2 | * | 4/2003 | Asano | C23C 16/401 |
| | | | | | 432/152 |
| 7,545,703 | B2 | * | 6/2009 | Lunde | G01V 1/201 |
| | | | | | 367/154 |
| 7,548,486 | B2 | * | 6/2009 | Tenghamn | G01V 1/201 |
| | | | | | 367/154 |
| 7,882,763 | B2 | * | 2/2011 | Kawakami | B62K 23/06 |
| | | | | | 74/502.2 |
| 8,398,803 | B2 | * | 3/2013 | Olsson | H01B 3/441 |
| | | | | | 156/242 |
| 9,064,626 | B2 | * | 6/2015 | Yoo | H01F 17/0013 |
| 9,267,677 | B2 | * | 2/2016 | Batts | F22B 27/16 |
| 2010/0163273 | A1 | | 7/2010 | Smedberg | |
| 2010/0314022 | A1 | | 12/2010 | Olsson | |
| 2012/0233831 | A1 | * | 9/2012 | Tsuji | H01L 31/1864 |
| | | | | | 29/33 R |

FOREIGN PATENT DOCUMENTS

| JP | 4-154008 A | 5/1992 |
| JP | 4-155713 A | 5/1992 |
| JP | 05051650 A * | 3/1993 |
| JP | 9-7443 A | 1/1997 |
| JP | 11-185553 A | 7/1999 |
| JP | 2002-260464 A | 9/2002 |
| JP | 2011-515791 A | 5/2011 |
| WO | WO 01/72493 A1 | 10/2001 |
| WO | WO 2009/103630 A1 | 8/2009 |

OTHER PUBLICATIONS

Kemper et al., "A New Method for the Detection and Quantification of Residual Volatiles in XLPE Electrical Cable Using Large-Spot Raman Spectroscopy", IEEE Transactions on Power Delivery, Jan. 1, 2011, vol. 26, No. 1, pp. 3-10.

* cited by examiner

METHOD FOR HEAT TREATMENT OF AN ELECTRIC POWER CABLE

TECHNICAL FIELD

The present invention relates to a method for heat treatment of an electric power cable, the electric power cable comprising a polymer-based electrical insulation system comprising a polymer composition. Further, the present invention relates to an apparatus for heat treatment of an electric power cable, the electric power cable comprising a polymer-based electrical insulation system comprising a polymer composition. The apparatus comprises a heating chamber arranged to receive and house the electric power cable.

BACKGROUND OF THE INVENTION

In prior art, polymer-based electrical insulation, e.g. extruded solid insulation based on a polyethylene, or a crosslinked polyethylene (XLPE), is often used for alternating current (AC) and direct current (DC) transmission and distribution cable insulation. To ensure that the electric power cables have good or correct dielectric properties and e.g. that any voids in the polymer-based electrical insulation are free of gas, the polymer-based electrical insulation is exposed to a heat treatment procedure after the electric power cable has been produced or assembled. For example, by means of the heat treatment procedure, the concentration of gaseous by-products, e.g. methane, acetophenone or cumyl alcohol, in the polymer-based electrical insulation is reduced or diminished. The by-products may originate from the crosslinking reactions. Acetophenone or cumyl alcohol by-products enhance the electrical conductivity. In prior art it is known to place the electric power cable having a polymer-based electrical insulation in a heating chamber in which the electric power cable is exposed to the heat treatment procedure. Often the electric power cable is first wound around a cable drum and then the cable drum with the electric power cable is placed in the heating chamber. This procedure may be called cable drum heat treatment.

US 2010/0163273-A1 discloses a process for preparing a crosslinked cable. One or more layers including a polymer composition is/are applied on a conductor, wherein at least one layer includes one or more free radical generating agents. Said at least one layer including said free radical generating agent(s) is crosslinked by radical reaction. The content of volatile decomposition products(s) is reduced or removed. It disclosed that the cable may be wound onto a cable drum and thereafter placed into a ventilated heating chamber in order to expose the cable to degassing at an elevated temperature.

US2010/0314022-A1 discloses a method for providing an insulated electric high voltage DC cable comprises the steps of providing a polymer-based insulation system comprising a compounded polymer composition; and subsequently exposing the polymer-based insulation system to a heat treatment procedure while the outer surface of the polymer-based insulation system is covered by a cover impermeable to a substance present in the polymer-based insulation system in a non-homogenous distribution.

JP2002-260464 describes a method for removing crosslinked residue of a polyolefin insulating cable. The cable wound around a cable drum is stored in a container and an electric current is passed to the cable while reducing the pressure in the container.

JP11-185553 discloses a cable heating room and a cable drum transfer device 5 including a carrying belt provided therein.

WO 01/72493-A1 discloses a method for removing by-products produced in a cable vulcanization process. In the method circulation gas is led from a gas space of vulcanization equipment into a gas circulation means after which the gas is led into a condenser where it is cooled, the by-products are condensed into a purification cell comprising a condensation surface, and the substantially purified circulation gas is reintroduced into the gas space of the vulcanization equipment.

The article "*The Role of Degassing in XLPE Power Cable Manufacture*" by T. Andrews et. al., Electrical Insulation Magazine, IEEE, vol. 22, No. 6, pp. 5-16, November-December 2006 (ISSN: 0883-7554), discloses the degassing of large power cables in large, heated chambers, the chambers being ventilated to avoid build-up of flammable methane and ethane.

The article "*A New Method for the Detection and Quantification of Residual Volatiles in XLPE Electrical Cable Using Large-Spot Raman Spectroscopy*" by Mark S. Kemper et. al., IEEE Transactions on Power Delivery, vol. 26, No. 1, pp. 3-10, January 2011 (ISSN: 0885-8977), discloses a section of a cable being placed in a degassing oven maintained at about 80 degrees at reduced pressure.

SUMMARY OF THE INVENTION

The inventors of the present invention have found that winding the electric power cable wound around a cable drum, which then is placed in a heating chamber, has drawbacks. One drawback is that there is a limitation with regard to the length of cable which can be exposed to the heat treatment in the heating chamber, i.e. not too long electric power cables wound around a cable drum can be placed in the heating chamber. When a long distance cable is required, a plurality of produced cables needs to be jointed to attain the required length. In general, cable joints are preferably avoided or the number of cable joints is preferably kept at a minimum.

The object of the present invention is to provide an improved heat treatment of electric power cables having a polymer-based electrical insulation.

A further object of the present invention is to provide a heat treatment of electric power cables having a polymer-based electrical insulation, which heat treatment is capable of exposing longer cables to a heat treatment procedure, and thus avoiding the need for cable joints or reducing the number of cable joints.

The above-mentioned objects of the present invention are attained by providing a method for heat treatment of an electric power cable, the electric power cable comprising a polymer-based electrical insulation system comprising a polymer composition, the method comprising the steps of placing the electric power cable having the polymer-based electrical insulation system into a heating chamber; and exposing the polymer-based electrical insulation system to a heat treatment procedure when the electric power cable is located in the heating chamber, wherein the step of placing the electric power cable into the heating chamber comprises winding the electric power cable about a substantially vertical center axis to form a substantially horizontal first layer of a plurality of substantially horizontal turns of the electric power cable;

winding the electric power cable about the center axis to form a plurality of substantially horizontal second layers, each second layer being formed by a plurality of substantially horizontal turns of the electric power cable; and stacking the plurality of horizontal second layers above the first layer.

By means of the method according to the present invention, longer electric power cables having a polymer-based electrical insulation can be exposed to a heat treatment procedure. Therefore, by means of the method according to the present invention, longer continuous electric power cables can be produced and the number of cable joints can be kept at a minimum, or even be avoided. Thus, by means of the method according to the present invention, an improved heat treatment of cables having polymer-based electrical insulation is provided. The electric power cable can be a DC cable or an AC cable. The polymer composition of the polymer-based electrical insulation system may comprise polyethylene, e.g. crosslinked polyethylene (XLPE).

It is to be understood that each layer of the substantially horizontal first layer and of the substantially horizontal second layers is at a level different from the levels of the other substantially horizontal layers. Thus, when winding the electric power cable about the center axis, the plurality of substantially horizontal second layers and the substantially horizontal first layer are formed such that each layer of the first and second layers is at a level different from the levels of the other substantially horizontal layers.

According to an advantageous embodiment of the method according to the present invention, the method is characterized by forming the first layer on a floor rotatable about the center axis while rotating the floor about the center axis, the center axis being substantially perpendicular to the floor. Since the substantially vertical center axis is substantially perpendicular to the floor, the floor is substantially horizontal. By providing the rotatable floor, the first layer is formed in an efficient manner.

According to a further advantageous embodiment of the method according to the present invention, the method is characterized by forming the plurality of substantially horizontal second layers while rotating the floor about the center axis. By forming the second layers while rotating the rotatable floor, the second layers are formed in an efficient manner.

According to another advantageous embodiment of the method according to the present invention, the method is characterized by forming the first layer within the heating chamber, and by forming and stacking the plurality of substantially horizontal second layers within the heating chamber. By means of this embodiment, the first and second layers are placed in the heating chamber in an efficient manner. Alternatively, the first layer may be formed outside of the heating chamber, and the plurality of substantially horizontal second layers may be formed and stacked outside of the heating chamber, and thereafter the electric power cable may be placed into the heating chamber.

According to yet another advantageous embodiment of the method according to the present invention, the number of the second layers is determined based on the properties of the electric power cable in order to avoid deformation of the electric power cable. Thus, the number of second layers may be chosen, e.g. increased or decreased, in dependence on the structural strength of the electric power cable. For example, an electric power cable with greater structural strength allows for a greater number of stacked second layers. By means of this embodiment, deformation of the electric power cable is avoided or reduced, since excessive stress on the electric power cable can be avoided.

According to still another advantageous embodiment of the method according to the present invention, the heat treatment procedure comprises exposing the polymer-based electrical insulation system to a heated gas or gas mixture. Exposing the polymer-based electrical insulation system to a heated gas or gas mixture is an efficient heat treatment procedure.

According to an advantageous embodiment of the method according to the present invention, the heat treatment procedure comprises jetting or blowing the heated gas or gas mixture to the first and second layers. By means of this embodiment, the heat treatment is further improved.

Alternatively, the heat treatment procedure may comprise heating at least one wall of the heating chamber. The at least one wall of the heating chamber may be heated by passing a heated fluid through the at least one wall of the heating chamber or by means of heating elements, e.g. electric heating elements, provided in the at least one wall of the heating chamber. Alternatively, the heat treatment procedure may comprise passing an electric current through an electrical inner conductor and/or a conductive outer screen of the electric power cable.

According to a further advantageous embodiment of the method according to the present invention, the method is characterized by ventilating the heating chamber during the heat treatment procedure to remove gaseous by-products, which originate from the polymer-based electrical insulation system, from the heating chamber. By means of this embodiment, the removal of gaseous by-products from the polymer-based electrical insulation system is improved since the gaseous by-products originating from the polymer-based electrical insulation system are removed from the heating chamber.

According to another advantageous embodiment of the method according to the present invention, the method is characterized by exposing the polymer-based insulation system to the heat treatment procedure while an outer surface of the polymer-based insulation system is covered by a cover impermeable to at least one substance present in the polymer-based insulation system in a non-homogenous distribution, thereby equalizing the concentration of the at least one substance in the polymer-based insulation system. By means of this embodiment, the equalization of the concentration of the at least one substance in the polymer-based insulation system is performed in an efficient manner. By means of this embodiment, the concentration of the at least one substance and thus the conductivity at the interfaces, i.e. inner and outer surfaces, of the polymer-based insulation system can be increased to thereby reduce the electric field and space charge at these interfaces.

The above-mentioned objects of the present invention are also attained by providing an apparatus for heat treatment of an electric power cable, the electric power cable comprising a polymer-based electrical insulation system comprising a polymer composition. The apparatus comprises a heating chamber arranged to receive and house the electric power cable, and the apparatus comprises heat treatment equipment arranged to expose the polymer-based electrical insulation system to a heat treatment procedure when the electric power cable is located in the heating chamber. The apparatus is arranged to rest on a substantially horizontal surface. The heating chamber is provided with a floor rotatable about a center axis, the center axis being substantially perpendicular to the floor and is arranged to be substantially perpendicular to the surface on which the apparatus is intended to rest. The floor is arranged to receive the electric power cable while rotating about the center axis in order to wind the electric power cable about the center axis to form a substantially horizontal first layer of a plurality of turns of the electric power cable and in order to wind the electric power cable about the center axis to form a plurality of substantially horizontal second layers, each second layer being formed by a plurality of turns of the electric power cable. The apparatus is arranged to stack the plurality of substantially horizontal second layers above the first layer in the heating chamber.

By means of the apparatus according to the present invention, longer cables having a polymer-based electrical insulation can be exposed to a heat treatment procedure and the number of cable joints can be kept at a minimum, or even be avoided. Thus, by means of the apparatus according to the present invention, an improved heat treatment of electric power cables having polymer-based electrical insulation is provided. The heating chamber may house said floor.

According to an advantageous embodiment of the apparatus according to the present invention, the heat treatment equipment is arranged to expose the polymer-based electrical insulation system to a heated gas or gas mixture in order to expose the polymer-based electrical insulation system to a heat treatment procedure. Exposing the polymer-based electrical insulation system to a heated gas or gas mixture is an efficient heat treatment procedure.

According to a further advantageous embodiment of the apparatus according to the present invention, the heat treatment equipment is arranged to jet or blow the heated gas or gas mixture to the first and second layers in order to expose the polymer-based electrical insulation system to a heat treatment procedure. By means of this embodiment, the heat treatment is further improved.

According to another advantageous embodiment of the apparatus according to the present invention, the apparatus comprises ventilation equipment arranged to ventilate the heating chamber during the heat treatment procedure in order to remove gaseous by-products, which originate from the polymer-based electrical insulation system, from the heating chamber. By means of this embodiment, the removal of gaseous by-products from the polymer-based electrical insulation system is improved since the gaseous by-products originating from the polymer-based electrical insulation system are removed from the heating chamber.

According to yet another advantageous embodiment of the apparatus according to the present invention, the heating chamber is provided with at least one wall extending around the floor and the center axis and extending in the direction of the center axis, wherein the at least one wall is rotatable. By means of this embodiment, the first layer and second layers can be formed in an efficient manner.

According to still another advantageous embodiment of the apparatus according to the present invention, the floor and/or the at least one wall are/is arranged to be rotatable in relation to the surface on which the apparatus is intended to rest.

The above-mentioned features and embodiments of the method and the apparatus, respectively, may be combined in various possible ways providing further advantageous embodiments.

Further advantageous embodiments of the method and the apparatus, respectively, according to the present invention and further advantages with the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

Figure 1:
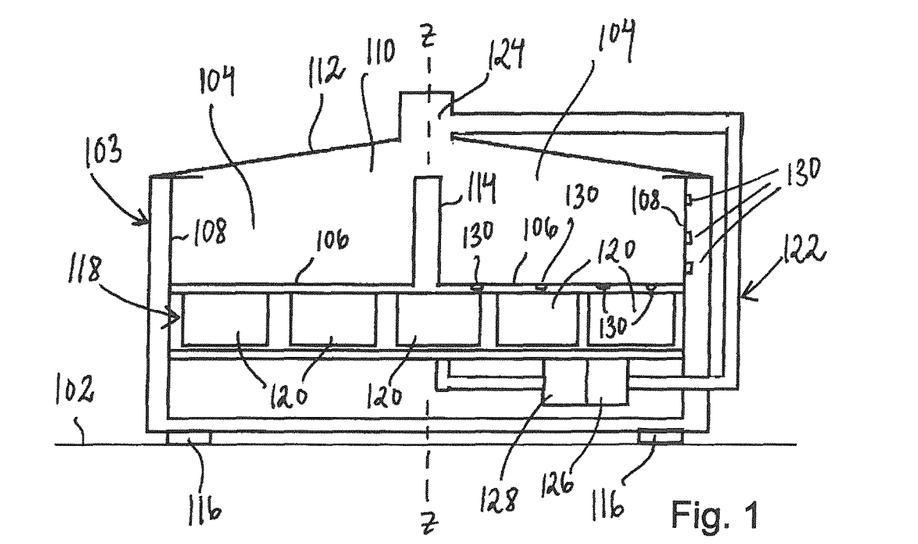
FIG. 1 is a schematic side cross-section view of a first embodiment of the apparatus according to the present invention.

FIG. 1 schematically shows a first embodiment of the apparatus for heat treatment of an electric power cable 402 (see FIG. 4), according to the present invention. The electric power cable comprises a polymer-based electrical insulation system 404 (see FIG. 4) comprising a polymer composition, e.g. a compounded polymer composition. The electric power cable can be a DC cable or an AC cable, e.g. a three-phase electric power cable. The electric power cable 402 may be a medium voltage cable, a high voltage cable, or an extra high voltage cable. The polymer composition of the polymer-based electrical insulation system 404 may comprise polyethylene, e.g. crosslinked polyethylene (XLPE). The electrical insulation system 404 may be an extruded solid insulator. The electric power cable 402 may comprise an inner electric conductor 406 (see FIG. 4) and further layers and members known to the person skilled in the art. The electrical insulation system 404 may be in the form of a tubular layer surrounding the inner electric conductor 406. The electric power cable 402 may be a submarine cable. The configuration of a DC cable, an AC cable and a submarine cable, respectively, is well known to the person skilled in the art and is thus not disclosed in further detail.

The apparatus is arranged to rest on a substantially horizontal surface 102. The apparatus may comprise a container 103 or receptacle. The apparatus comprises a heating chamber 104 arranged to receive and house the electric power cable 402. The container 103 may house the heating chamber 104. The apparatus may comprise a floor 106, which may be arranged to be substantially parallel to said surface 102, and at least one wall 108, which may have a tubular shape and may extend around the floor 106. The floor 106 may have a circular shape. The at least one wall 108 may be arranged to extend substantially perpendicular to said floor 106. The heating chamber 104 may be provided with the floor 106 and may be provided with the wall 108. Thus, the heating chamber 104 may be defined by the floor 106 and the wall 108, and may have an opening 110, which may open upwardly. The apparatus may comprise a lid 112, or cover, arranged to close the opening 110. In the centre of the heating chamber 104, a substantially vertical column 114, or drum, may be provided. The apparatus may be rotatable about a center axis z-z in relation to the surface 102, e.g. by means of conventional guides 116 or bearings, and thus also the floor 106 and the at least one wall 108 may be rotatable about the center axis z-z in relation to the surface 102. The center axis z-z is substantially perpendicular to the floor 106 and is arranged to be substantially perpendicular to the surface 102 on which the apparatus is intended to rest. The at least one wall 108 may extend around the center axis z-z and extend in the direction of the center axis z-z. The center axis z-z may be collinear with the center axis of the vertical column 114.

Figure 4:
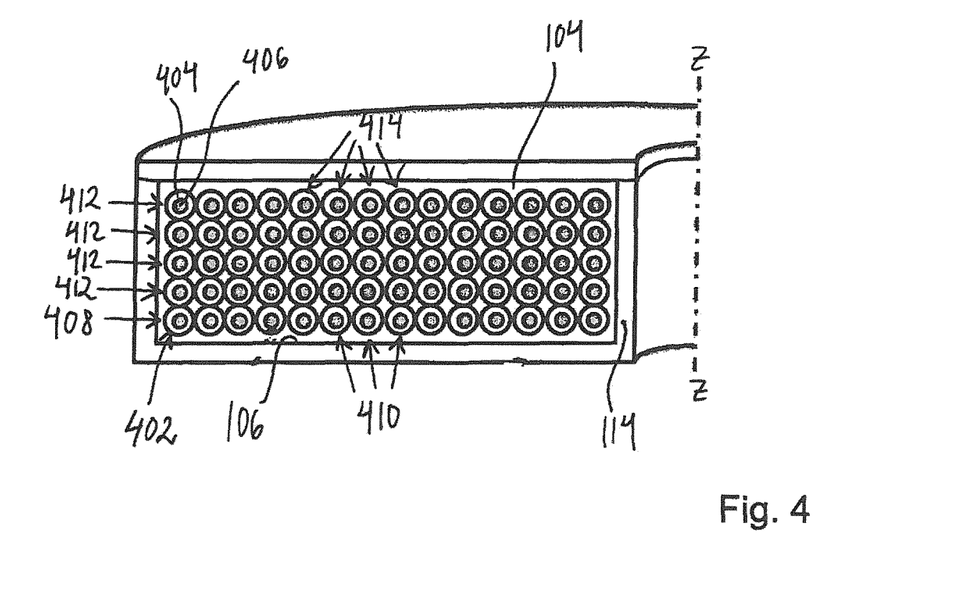
FIG. 4 is a schematic side cross-section view of a plurality of horizontal layers of an electric power cable placed in a heating chamber according to an embodiment of the method according to the present invention.

With reference to FIGS. 1 and 4, where FIG. 4 is a simplified view of the heating chamber 104 of the apparatus of FIG. 1, the floor 106 is arranged to receive the electric power cable 402 (see FIG. 4) while rotating about the center axis z-z in order to wind the electric power cable 402 about the center axis z-z to form a substantially horizontal first layer 408 of a plurality of turns 410 of the electric power cable 402 and in order to wind the electric power cable 402 about the center axis z-z to form a plurality of substantially horizontal second layers 412, each second layer 412 being formed by a plurality of turns 414 of the electric power cable 402. In FIG. 4, only four second layers 412 are illustrated, but it is to be understood that the more or fewer second layers 412 may be formed. Further, in FIG. 4, only half of the heating chamber 104 (the part to the left of the center axis z-z in FIG. 1) is illustrated, but it is to be understood that the first and second layers 408, 412 and the heating chamber 104 extend all around the center axis z-z. The apparatus is arranged to stack the plurality of substantially horizontal second layers 412 above the first layer 408 in the heating chamber 104.

The apparatus comprises heat treatment equipment 118 arranged to expose the polymer-based electrical insulation system 404 to a heat treatment procedure when the electric power cable 402 is located in the heating chamber 104. Thus, the heating chamber 104 may be heated, i.e. the temperature in chamber may be increased, e.g. after being closed by the lid 112. The heat treatment equipment 118 may be arranged to expose the polymer-based electrical insulation system 404 to a heated gas or gas mixture, e.g. air, in order to expose the polymer-based electrical insulation system 404 to a heat treatment procedure. The heat treatment equipment 118 may be arranged to jet or blow the heated gas or gas mixture to the first and second layers 408, 412 in order to expose the polymer-based electrical insulation system 404 to a heat treatment procedure. The heat treatment equipment 118 may comprise one or a plurality of heating devices 120 arranged to supply heated gas or gas mixture. Each heating device 120 may comprise a fan arranged to blow or jet the heated gas or gas mixture into the heating chamber 104. The floor 106 may e.g. be provided with a plurality of openings and each heating device 120 may be arranged to supply the heated gas or gas mixture to the heating chamber 104 via the openings of the floor 106. The apparatus may comprise ventilation equipment 122 arranged to ventilate the heating chamber 104 during the heat treatment procedure in order to remove gaseous by-products, which originate from the polymer-based electrical insulation system 404, from the heating chamber 104. The heating chamber 104 may be provided with an outlet 124, e.g. provided in the lid 112 or in the at least one wall 108, for discharge of gas mixture/-s including gaseous by-products. The ventilation equipment 122 may comprise a filter 126 to filter the discharged gas mixture to remove the gaseous by-products from the discharged gas mixture in order to reuse the discharged heated gas mixture for the heat treatment procedure in the heating chamber 104. The ventilation equipment 122 may comprise a fan 128 adjacent to the filter 126. The apparatus may comprise temperature sensors 130 placed in the heating chamber 104 or adjacent to the heating chamber 104 in order to detect the temperature of the heating chamber 104. The temperature sensors 130 may be placed in the floor 106 and in the at least one wall 108. The heat treatment equipment 118 may be connected to, or communicate with, the temperature sensors 130 and may be arranged to control the heat treatment procedure at least partially based on the temperatures detected by the temperature sensors 130, e.g. by increasing or decreasing the temperature of the heating chamber 104. The heating chamber 104 may e.g. have a diameter of about 30 meters and a height of about 5-8 meters. However, other dimensions of the heating chamber 104 are possible and may in general be adapted to the dimensions of the cable to be treated. The apparatus may be provided with a cable feeding arm (not shown) arranged to feed the cable when placing the cable into the heating chamber 104. The cable feeding arm may be movable in a radial direction in relation to the center axis z-z.

Figure 2:
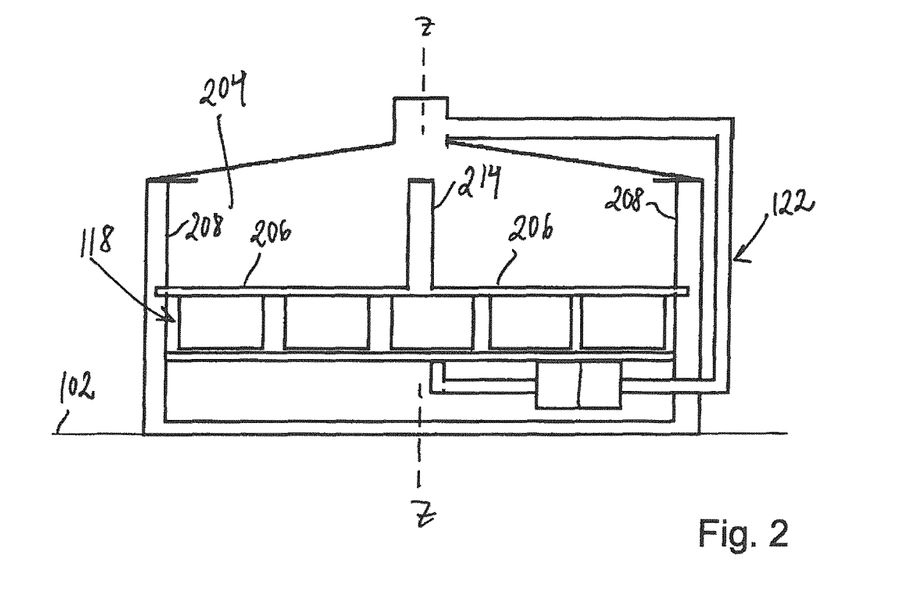
FIG. 2 is a schematic side cross-section view of a second embodiment of the apparatus according to the present invention.

With reference to FIG. 2, a second embodiment of the apparatus according to the present invention is schematically illustrated. The second embodiment of FIG. 2 essentially corresponds to the first embodiment of FIG. 1, but with the difference that the floor 206 of the heating chamber 204, which is arranged to receive the electric power cable 402, is rotatable about the center axis z-z in relation to the surface 102, whereas the at least one wall 208 is stationary. Thus, the floor 206 may be rotatable about the center axis z-z in relation to the at least one wall 208, e.g. by means of conventional guides or bearings (not shown). The substantially vertical column 214 may also the rotatable about the center axis z-z in relation to at least one wall 208 and in relation to the surface 102. Otherwise, the floor 206 is arranged to receive the electric power cable 402 (see FIG. 4) while rotating about the center axis z-z in a manner corresponding to the floor 106 of the first embodiment as disclosed above.

Figure 3:
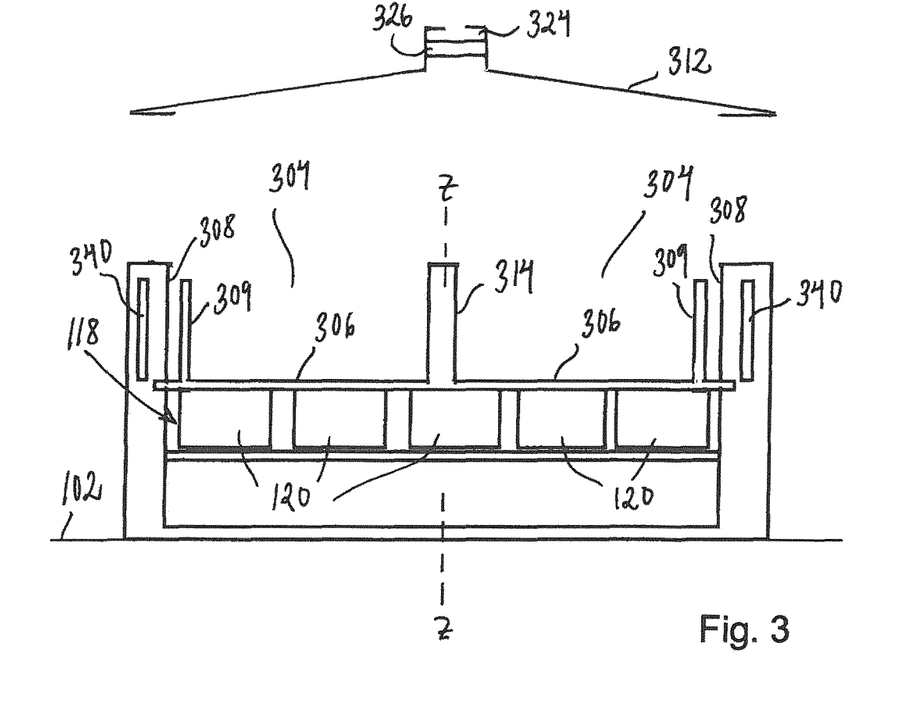
FIG. 3 is a schematic side cross-section view of a third embodiment of the apparatus according to the present invention.

With reference to FIG. 3, a third embodiment of the apparatus according to the present invention is schematically illustrated. The third embodiment of FIG. 3 corresponds to a certain extent to the second embodiment, and has e.g. a floor 306 of the heating chamber 304, which is arranged to receive the electric power cable 402, that is rotatable about the center axis z-z in relation to the surface 102 and in relation to the at least one wall 308, which is stationary. Further, the apparatus of FIG. 3 comprises at least one inner wall 309 that is rotatable about the center axis z-z in relation to the at least one wall 308 and in relation to the surface 102. The at least one inner wall 309 may extend around the floor 306 and around the center axis z-z and extend in the direction of the center axis z-z. The at least inner one wall 309 may have a tubular shape. The at least one inner wall 309 may be provided with a plurality of openings. The substantially vertical column 314 may also be rotatable about the center axis z-z in relation to at least one wall 308 and in relation to the surface 102. Otherwise, the floor 306 is arranged to receive the electric power cable 402 (see FIG. 4) while rotating about the center axis z-z in a manner corresponding to the floor 206 of the second embodiment as disclosed above. The third embodiment of the apparatus has no ventilation equipment as shown in FIGS. 1 and 2. The apparatus of FIG. 3 has an outlet 324, e.g. provided in the lid 312 or in the at least one wall 308, for discharge of gas mixture/-s including gaseous by-products, and the outlet 324 may be provided with a filter 326 to filter the discharged gas mixture to remove the gaseous by-products from the discharged gas mixture. Further, the at least one wall 308 of the heating chamber 304 may comprise a conduit system 340 for circulating a heated fluid to heat the at least one wall 308 and the heating chamber 304 in order to expose the polymer-based electrical insulation system 404 to a heat treatment procedure when the electric power cable 402 is located in the heating chamber 304. The heating devices 120 could be removed. Alternatively, the at least one wall 308 of the heating chamber 304 may be provided with electric heating elements to heat the heating chamber 304 in order to expose the polymer-based electrical insulation system 404 to a heat treatment procedure.

Figure 5:
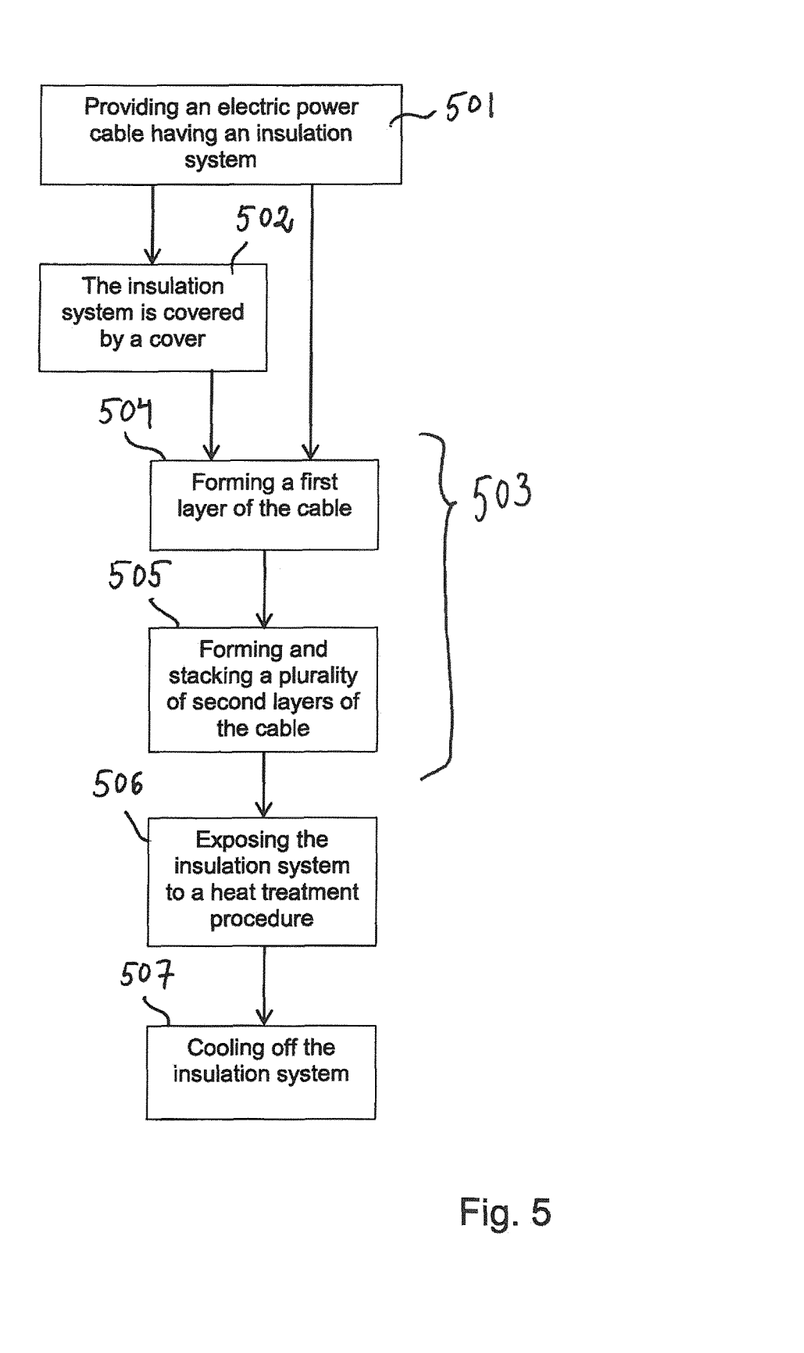
FIG. 5 is a flow chart illustrating an embodiment of the method according to the present invention.

With reference to FIGS. 4 and 5, aspects of an embodiment of the method for heat treatment of an electric power cable 402, according to the present invention are schematically illustrated, where the electric power cable 402 comprises a polymer-based electrical insulation system 404 comprising a polymer composition. The method may comprise the following steps: A produced/assembled electric power cable 402 having a polymer-based electrical insulation system 404 comprising a polymer composition is provided, at step 501. If the concentration of at least one substance in the polymer-based insulation system is to be equalized, the outer surface of the polymer-based insulation system may be covered by a cover impermeable to the at least one substance present in the polymer-based insulation system, at step 502. The at least one substance may include at least one by-product from a cross-linking of the polymer-based electrical insulation system and at least one additive. The least one by-product may include peroxide decomposition products, such as acetophenone and cumyl alcohol, and the at least one additive may include one or more antioxidants and scorch retarders. Further details of step 502 are disclosed in US2010/0314022-A1, which is hereby incorporated by reference. After step 502, the electric power cable having the polymer-based electrical insulation system may be placed into a heating chamber, at stage 503. If the above-mentioned equalization of the concentration of the at least one substance is not to be performed, the electric power cable having the polymer-based electrical insulation system is placed into a heating chamber without step 502. The stage of placing the electric power cable having the polymer-based electrical insulation system into the heating chamber may comprise the following steps: The electric power cable is wound about a substantially vertical center axis to form a substantially horizontal first layer of a plurality of substantially horizontal turns of the electric power cable, at step 504; The electric power cable is wound further about the center axis to form a plurality of substantially horizontal second layers, each second layer being formed by a plurality of substantially horizontal turns of the electric power cable; and the plurality of horizontal second layers is stacked above the first layer, at step 505. Each second layer may be placed on another second layer or on the first layer. In alternative words, the second layers are stacked one above another second layer or above the first layer in the direction of the center axis. The number of the second layers may be determined based on the properties of the electric power cable, e.g. the structural strength of the electric power cable, in order to avoid deformation of the electric power cable. Each horizontal layer may have a spiral shape. The first layer may be formed on a floor rotatable about the center axis while rotating the floor about the center axis. The center axis is substantially perpendicular to said floor. The plurality of substantially horizontal second layers may be formed while rotating the floor about the center axis. The first layer may be formed within the heating chamber, and the plurality of substantially horizontal second layers may be formed and stacked within the heating chamber. Advantageously, the layers should not be too firmly stacked.

It is to be understood that each layer 408, 412 of the substantially horizontal first layer 408 and of the substantially horizontal second layers 412 is at a level different from the levels of the other substantially horizontal first and second layers 408, 412. Thus, when winding the electric power cable 402 about the center axis z-z, the plurality of substantially horizontal second layers 412 and the substantially horizontal first layer 408 are formed such that each layer 408, 412 of the first and second layers 408, 412 is at a level different from the levels of the other first and second layers 408, 412.

When the electric power cable has been placed in the heating chamber, the opening of heating chamber may be closed, e.g. by a lid as disclosed above. The method further comprises exposing the polymer-based electrical insulation system to a heat treatment procedure when the electric power cable is located in the heating chamber, at step 506. The heat treatment procedure may comprise exposing the polymer-based electrical insulation system to a heated gas or gas mixture, e.g. by jetting or blowing the heated gas or gas mixture to the first and second layers, which may be performed by the above-mentioned one or more heating devices 120. Alternatively, or in addition, the heat treatment procedure may comprise heating at least one wall of the heating chamber, e.g. as disclosed above, and/or passing an electric current through the electrical inner conductor 406 and/or a conductive outer screen of the electric power cable 402. While exposing the polymer-based electrical insulation system to the heat treatment procedure, the heating chamber may be ventilated in order to remove gaseous by-products, which originate from the polymer-based electrical insulation system, from the heating chamber. If the method includes step 502, the method provides an advantageous equalization of the concentration of at least one substance in the polymer-based insulation system. If the method does not include step 502, the method provides an advantageous degassing of the polymer-based electrical insulation system, during which the concentration of gaseous by-products, e.g. methane, acetophenone or cumyl alcohol, in the polymer-based electrical insulation is reduced or diminished. By means of said ventilation, the gaseous by-products are removed from the heating chamber and from the region around the cable, whereby an efficient degassing is attained. During the heat treatment procedure, the temperature of the heating chamber may be kept at about 70° C. Other temperatures are possible. By means of the above-mentioned temperature sensors, the temperature may be detected and monitored. If necessary, the heating of the heating chamber may be adjusted based on the at least one detected temperature, or the duration of the heat treatment procedure may be adjusted. The duration of the heat treatment procedure, also called the heating period, may depend on the dimensions and materials of the cable. After the heat treatment procedure, the polymer-based electrical insulation system of the cable may be cooled off, at step 507, during the so called cooling period. The polymer-based electrical insulation system and the cable may be cooled off while still being located in the heating chamber. With reference to FIG. 1, the cooling may be performed by turning off the heat of the heating devices 120, but the fans of heating devices 120 may still be active and circulate the gas mixture of the heating chamber. The cable exposed to the heat treatment procedure may have a length of about 10-100 km.

The features of the different embodiments of the method and apparatus, respectively, disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. A method for heat treatment of an electric power cable, the electric power cable comprising a polymer-based electrical insulation system comprising a polymer composition, the method comprising the steps of:
   placing the electric power cable having the polymer-based electrical insulation system into a heating chamber; and
   exposing the polymer-based electrical insulation system to a heat treatment procedure when the electric power cable is located in the heating chamber, wherein the heat treatment procedure starts after the step of placing the electric power cable into the heating chamber has been completed,
   wherein the step of placing the electric power cable into the heating chamber comprises the steps of:
      winding the electric power cable in the heating chamber about a substantially vertical center axis when being placed into the heating chamber to form a substantially horizontal first layer of a plurality of substantially horizontal turns of the electric power cable in the heating chamber; and
      winding after the forming of the first layer the electric power cable in the heating chamber about the vertical center axis and above the first layer in the heating chamber when being placed into the heating chamber to form a plurality of substantially horizontal second layers in the heating chamber, each second layer being formed by a plurality of substantially horizontal turns of the electric power cable, thereby stacking the plurality of horizontal second layers above the first layer along the vertical center axis.

2. The method according to claim 1, further comprising the step of forming the first layer on a floor rotatable about the vertical center axis while rotating the floor about the vertical center axis, the vertical center axis being substantially perpendicular to the floor.

3. The method according to claim 2, further comprising the step of forming the plurality of substantially horizontal second layers while rotating the floor about the vertical center axis.

4. The method according to claim 3, wherein the number of the second layers is determined based on the properties of the electric power cable in order to avoid deformation of the electric power cable.

5. The method according to claim 3, wherein the heat treatment procedure comprises exposing the polymer-based electrical insulation system to a heated gas or gas mixture.

6. The method according to claim 3, further comprising the step of ventilating the heating chamber during the heat treatment procedure to remove gaseous by-products, which originate from the polymer-based electrical insulation system, from the heating chamber.

7. The method according to claim 2, wherein the number of the second layers is determined based on the properties of the electric power cable in order to avoid deformation of the electric power cable.

8. The method according to claim 2, wherein the heat treatment procedure comprises exposing the polymer-based electrical insulation system to a heated gas or gas mixture.

9. The method according to claim 2, further comprising the step of ventilating the heating chamber during the heat treatment procedure to remove gaseous by-products, which originate from the polymer-based electrical insulation system, from the heating chamber.

10. The method according to claim 1, wherein the number of the second layers is determined based on the properties of the electric power cable in order to avoid deformation of the electric power cable.

11. The method according to claim 10, wherein the heat treatment procedure comprises exposing the polymer-based electrical insulation system to a heated gas or gas mixture.

12. The method according to claim 1, wherein the heat treatment procedure comprises exposing the polymer-based electrical insulation system to a heated gas or gas mixture.

13. The method according to claim 12, wherein the heat treatment procedure comprises jetting or blowing the heated gas or gas mixture to the first and second layers.

14. The method according to claim 1, further comprising the step of ventilating the heating chamber during the heat treatment procedure to remove gaseous by-products, which originate from the polymer-based electrical insulation system, from the heating chamber.

15. The method according to claim 1, further comprising the step of exposing the polymer-based insulation system to the heat treatment procedure while an outer surface of the polymer-based insulation system is covered by a cover impermeable to at least one substance present in the polymer-based insulation system in a non-homogenous distribution, thereby equalizing the concentration of the at least one substance in the polymer-based insulation system.

* * * * *